US006775757B1

(12) United States Patent
Greicar (10) Patent No.: US 6,775,757 B1
(45) Date of Patent: Aug. 10, 2004

(54) MULTI-COMPONENT PROCESSOR

(75) Inventor: Richard K. Greicar, Moss Beach, CA (US)

(73) Assignee: Genesis Microchip Inc., Alviso, CA (US)

(*) Notice: Subject to any disclaimer, the term of this patent is extended or adjusted under 35 U.S.C. 154(b) by 752 days.

(21) Appl. No.: 09/678,857

(22) Filed: Oct. 2, 2000

Related U.S. Application Data (60) Provisional application No. 60/170,668, filed on Dec. 14, 1999, and provisional application No. 06/170,607, filed on Dec. 14, 1999.

(51) Int. Cl.[7] ............................................. G06F 12/00
(52) U.S. Cl. ..................................................... 711/170
(58) Field of Search ................................. 711/170–172

(56) References Cited

U.S. PATENT DOCUMENTS

| | | | |
|---|---|---|---|
| 3,596,257 A | | 7/1971 | Patel |
| 3,753,239 A | | 8/1973 | Lindsey et al. |
| 4,084,224 A | | 4/1978 | Appell et al. |
| 4,888,691 A | | 12/1989 | George et al. |
| 4,947,477 A | * | 8/1990 | Little ........................... 711/173 |
| 5,109,499 A | * | 4/1992 | Inagami et al. .............. 711/147 |
| 5,276,847 A | * | 1/1994 | Kohn ........................... 711/163 |
| 5,335,325 A | * | 8/1994 | Frank et al. ................. 711/163 |
| RE34,850 E | | 2/1995 | Murakami et al. |
| 5,465,361 A | | 11/1995 | Hoenninger, III |
| 5,479,638 A | * | 12/1995 | Assar et al. .................. 711/103 |
| 5,491,827 A | * | 2/1996 | Holtey ......................... 711/163 |
| 5,499,348 A | | 3/1996 | Araki et al. |
| 5,561,786 A | | 10/1996 | Morse |
| 5,765,025 A | | 6/1998 | Morimoto et al. |
| 5,968,143 A | | 10/1999 | Chisholm et al. |
| 6,058,474 A | | 5/2000 | Baltz |
| 6,161,169 A | | 12/2000 | Cheng |
| 6,170,049 B1 | | 1/2001 | So |
| 6,175,900 B1 | | 1/2001 | Forin et al. |
| 6,182,203 B1 | | 1/2001 | Simar, Jr. et al. |
| 6,202,143 B1 | * | 3/2001 | Rim ............................ 712/210 |
| 6,205,522 B1 | * | 3/2001 | Hudson et al. .............. 711/147 |
| 6,240,497 B1 | * | 5/2001 | Yagi ............................ 711/170 |

* cited by examiner

Primary Examiner—Matthew D. Anderson
(74) Attorney, Agent, or Firm—Beyer Weaver & Thomas, LLP (57) ABSTRACT

A processor having a limited amount of local memory for storing code and/or data utilizes a program stored in external memory. The program stored in external memory is configured into blocks which can be loaded individually into the local memory for execution. Queuing the individual blocks of code allows the program to be executed by the processor and also facilitates loading of the subsequent code to be executed. A semaphore system can be utilized to indicate which blocks of local memory are available/unavailable. The system can support the interaction of multiple independent programs in external memory.

16 Claims, 8 Drawing Sheets

MULTI-COMPONENT PROCESSOR

CROSS-REFERENCES TO RELATED APPLICATIONS

This application claims the benefit of U.S. application Ser. No. 60/170,668 filed Dec. 14, 1999 entitled "Multi-Component Decoding" and U.S. application Ser. No. 60/170,607 filed Dec. 14, 1999 entitled "Method of Processing Data," which are both hereby incorporated by reference.

BACKGROUND

This invention relates generally to the implementation of complex computations in an environment that has limited storage and execution resources. More particularly, this invention relates to processors which are required to execute complex algorithms and which have limited memory, such as random access memory (RAM).

In the audio/video field, complex algorithms must often be performed to decompress and manipulate audio and video data so that the data can be broadcast in real time. For example, use of MPEG protocols to transmit data requires that header information be removed from the payload data before the payload data can be displayed or played. Similarly, where data is compressed, the data must be decompressed so that it can be put to use. In addition data is often manipulated to achieve some sort of effect, such as an enhanced audio or video effect. For example, where a change in color tone or contrast is desired, video data can be changed. Where a change in audio quality is desired, the audio data can be manipulated. Thus, a variety of processes can be performed on audio and video data. Nevertheless, it comes at a cost of time and resources.

When complex algorithms are implemented, they require a great deal of resources. Namely, they often require that a long sequence of instructions be implemented by a computer program, e.g., tens of thousands of different instructions. They also often require a great deal of memory for the storage of operands and data. Hence, when these algorithms are to be implemented by a standalone device such as a microprocessor or a set-top box in which memory for the storage of instructions and memory for the storage of data is limited, it becomes extremely difficult to implement the algorithms.

In addition, it is often necessary to mix and match different algorithms (e.g., MPEG) decoding with Prologic processing or DTS decoding with small speaker adjustments). Furthermore, it is inevitable that additional algorithms will be created in the future which will need to be able to interact with present algorithms. Thus, there is a need for a well-defined way in which the older algorithms can be implemented to interact with future additions.

Thus, there is a need for a device which is capable of allowing complicated mathematical algorithms to be performed while utilizing a limited amount of on-board random access memory by a processor. There is also a need for a system that allows portions of code for an algorithm to be moved into memory of a processor in an organized manner such that the disadvantages outlined above can be overcome. Similarly, there is a need for a system that permits a microprocessor to implement the code for an algorithm that cannot be stored completely by the local memory of the microprocessor in a time efficient manner. Another need is for a system that provides a framework that defines a manner in which algorithms are interchangeable into memory. Similarly, there is a need for a well-defined system in which new algorithms can be implemented with existing algorithms.

SUMMARY

One embodiment of the invention provides for an apparatus having a processor operable to process code and data; a first local memory of the processor; a second local memory of the processor; a third memory separate from the first and second local memory; wherein the first and second local memories are configured into predefined memory units that can accept contents of the code stored in the third memory.

Another embodiment of the invention provides a method, as well as program means for performing the functions of the method, of providing a processor operable for processing data, such as processing audio data; organizing a program of code into blocks of code which can individually be inserted into the processor's local memory; and operating on the individual blocks of code as they are moved into local memory.

Another embodiment of the invention allows for more than one algorithm to be implemented sequentially, for example, a Karaoke Echo processing algorithm followed by a reverberation algorithm in regard to audio data. Such an embodiment can load the blocks of code of the algorithms and execute them until an algorithm is finished processing; as space in the local memory becomes available prior to the final execution of a first algorithm, a first block of code for the second algorithm can be loaded into the local memory.

Other and further advantages and features of the invention will be apparent to those skilled in the art from a consideration of the following description taken in conjunction with the accompanying drawings wherein certain methods of and apparatuses for practicing the invention are illustrated. However, it is to be understood that the invention is not limited to the details disclosed but includes all such variations and modifications as fall within the spirit of the invention and the scope of the appended claims.

DESCRIPTION

Figure 1:
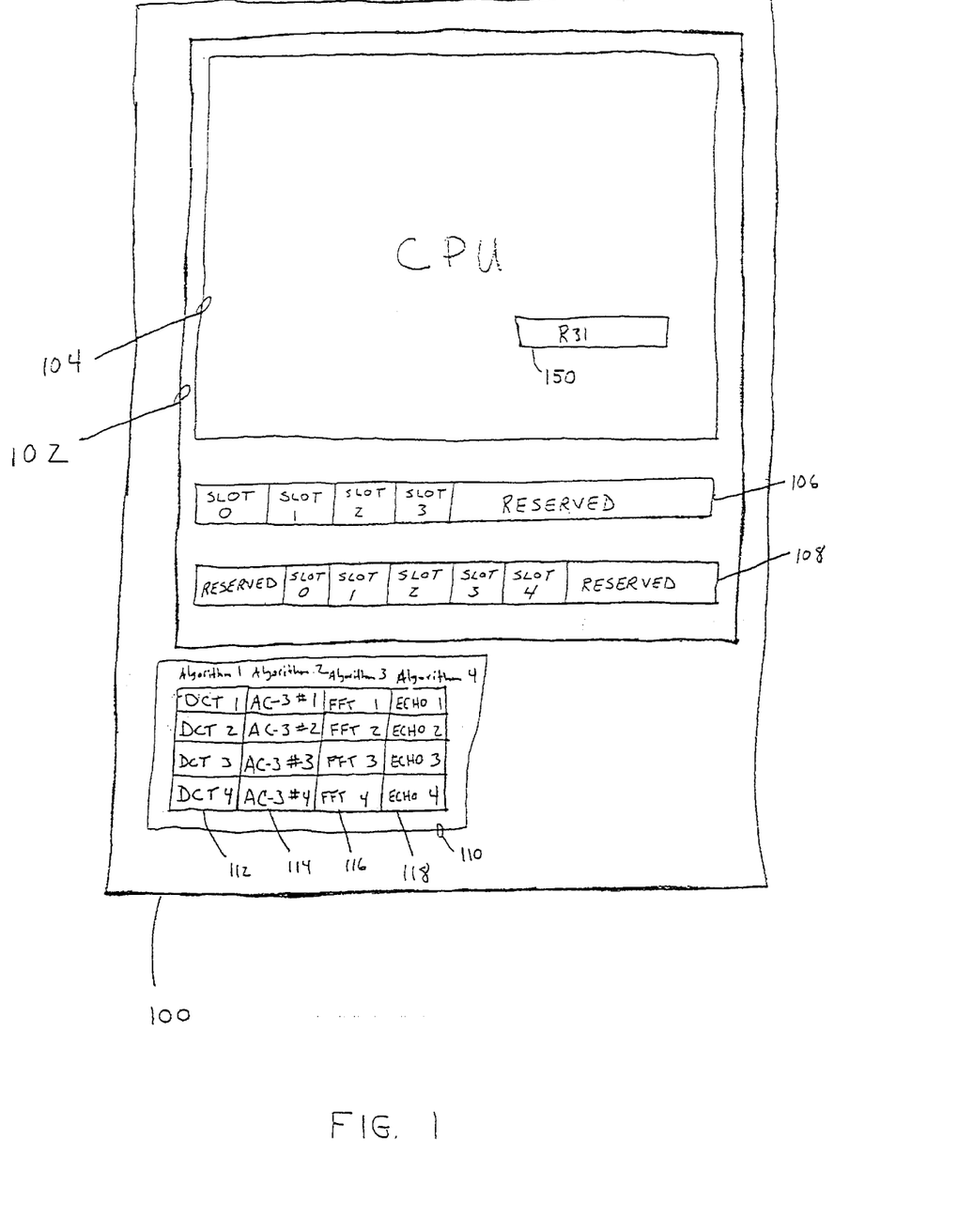
FIG. 1 shows a block diagram of a consumer device having a processor with local memory divided into blocks of memory as well as reserved memory.

Referring now to the figures and more particularly to FIG. 1 an apparatus for one embodiment of the invention can be seen. FIG. 1 is shown as a common consumer electronic device 100, such as a set-top box which receives audio and video data from a cable company. It could easily be any device which accepts audio or video data, such as a DVD program, from a source. The set-top box shown in FIG. 1 utilizes a processor 102 and external memory 110. The external memory can be SDRAM or alternative types of memory as would be understood by those of ordinary skill in the art. The processor 102 is shown as having a CPU 104 and local memory 106 and 108. Local memory is memory that is actually part of the processor rather than being separate from the processor. Hence, the access time is significantly faster.

The local memory blocks 106 and 108 in FIG. 1 are shown as divided into sections. Local memory 106 is preferably 8 kilobytes in size, but larger or smaller sizes could be used. To implement the preferred embodiment of the invention, half of this memory is utilized for loading code stored external from the processor 102. The remaining half is reserved so that the support code for the invention can be stored there. Similarly, local memory block 108 is preferably approximately 8 kilobytes in size. Three kilobytes of the local memory block 108 are held in reserve for the invention's variable storage while 5 kilobytes are used to store data. The portions of memory blocks 106 and 108 that are used for code and data respectively are partitioned or segmented into units. Hence, local memory block 106 is considered to have 4 "slots" or units of memory of 1 kilobyte in size. Similarly, local memory block 108 is considered to have 5 "slots" or units of memory of 1 kilobyte in size. Note that the invention can operate with different slot counts and sizes; hence block 106 could have 8 blocks of size 512 bytes. The local memory blocks 106 and 108 are accessible by the CPU 104 of the processor via a bus (not shown). A register 150, designated as "R31" is shown as part of CPU 104. Such a register can be utilized to store a flag or "semaphore." Individual bit locations of the register can be associated with the code and data segments in local memory 106 and 108. In this way, different routines keep track of whether a segment of local memory is occupied, being loaded, available for loading new code or data, etc. In addition, CPU registers, such as R31, can be accessed more rapidly than RAM variables.

FIG. 1 also shows an external memory 110, i.e., memory separate from the processor. External memory 110 is preferably synchronized dynamic random access memory (SDRAM) coupled to processor 102. However, it is envisioned that this external memory could take the form of other memory devices as well. Furthermore, while the memory is shown as being located within electronic device 100, in some embodiments it might be preferable to locate it external from such a device. External memory 110 is shown storing code for several algorithms. Namely, a Discrete Cosine Transform (DCT) algorithm is shown stored in a memory block 112 as divided into 4 segments of code, DCT1, DCT2, DCT3, and DCT4. Similarly, an AC-3 routine is shown stored in memory block 114 as code segments AC-3 #1, AC-3 #2, AC-3 #3, and AC-3 #4. Memory 116 and 118 are shown storing code for Fast Fourier Transform (FFT) and an Echo special effects algorithm, respectively. For example, while the code stored in memory 112 would normally be considered just a DCT routine, it is segmented into four segments or blocks so that each block can fit into the limited memory capacity of processor 102, namely into the available slots of local memory 106 and 108 depending on whether code or data is being transferred, respectively.

Figure 2A:
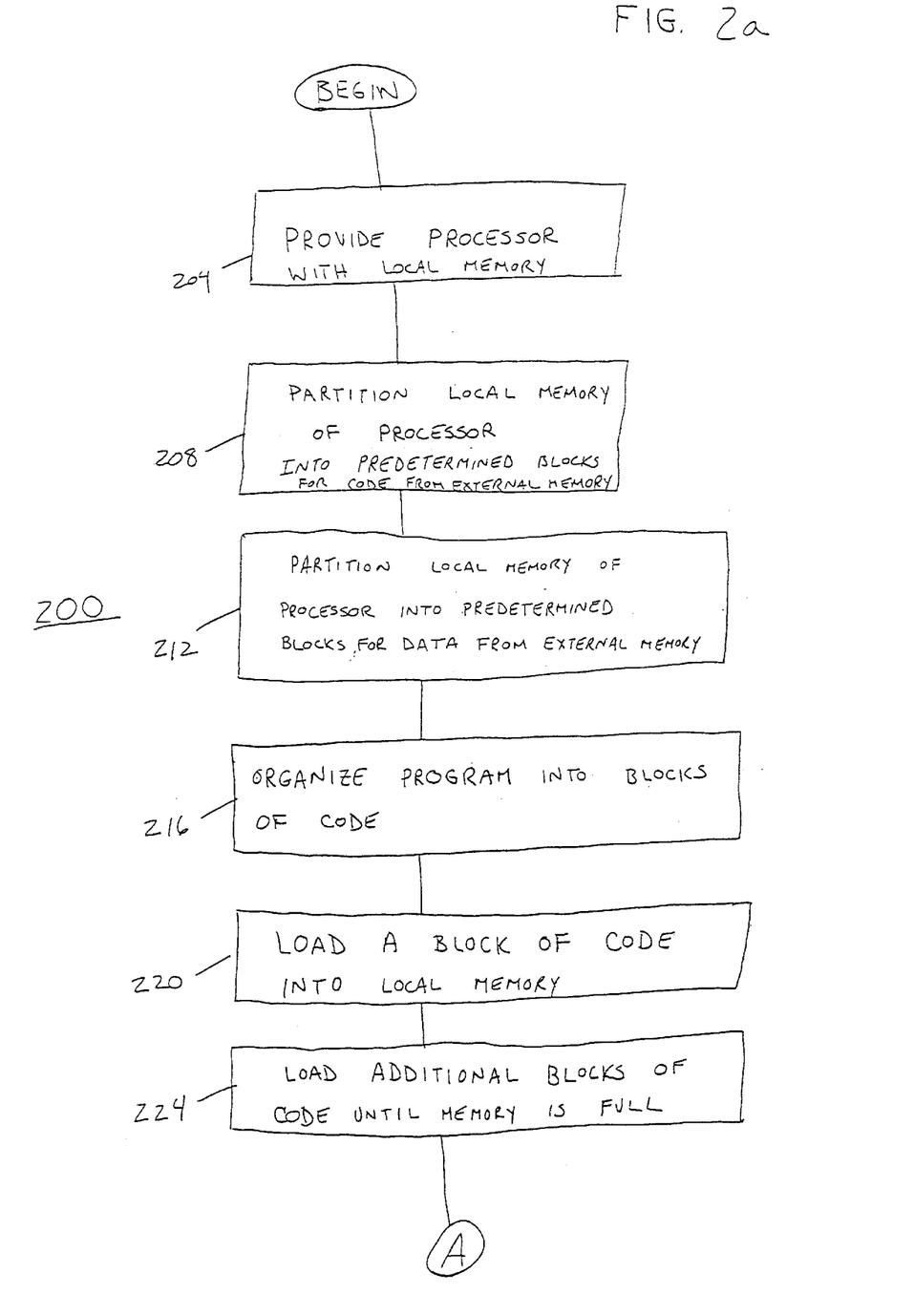
FIGS. 2a and 2b show a flow diagram for implementing an algorithm stored in external memory by loading it a block at a time into local memory.
Figure 2B:
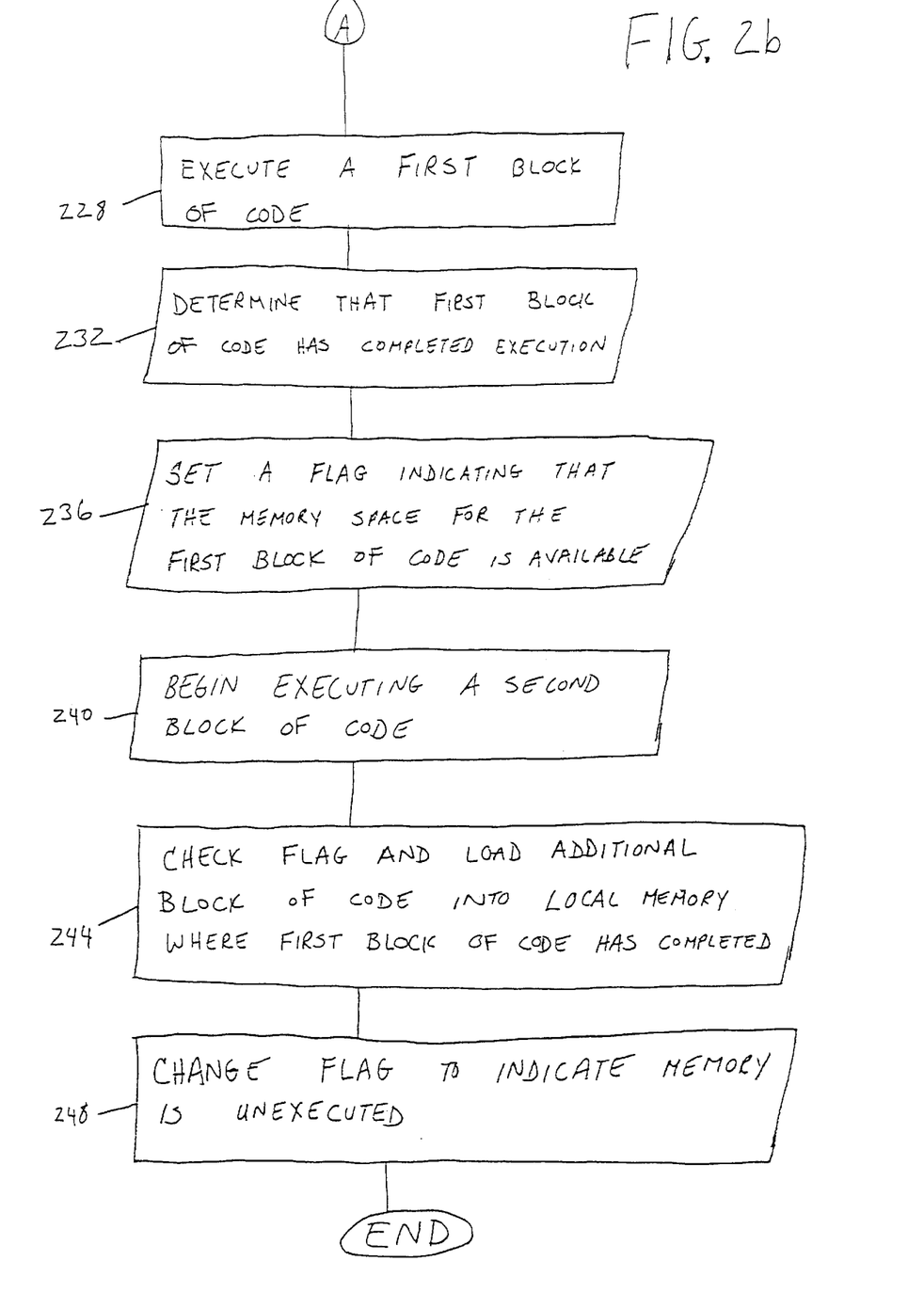

FIGS. 2A and 2B show a flow chart 200 that demonstrates a method for implementing an embodiment of the invention. In FIG. 2, a processor is provided with local memory 204. This local memory of the processor is partitioned into predetermined blocks or segments for storing code from external memory 208. Similarly, the local memory of the processor is also partitioned into predetermined blocks or segments for storing data from external memory 212. While it is preferable to make the blocks of equivalent size, this is not required.

A program which is to be utilized by the processor, such as a Discrete Cosine Transform (DCT) routine or a Reverberation routine can be stored in external memory. Such program routines are often required to process a datastream, such as an MPEG datastream received by a DVD player. Because such programs cannot be loaded in their entirety into the limited local memory of the processor, such as a processor having only 8 kilobytes of local memory for code and 8 kilobytes of local memory for data, the program routines are organized into blocks or segments of code 216. These smaller blocks of code can be loaded into the limited local memory. Once the various routines are partitioned into blocks, a first block of code from a routine is loaded into the local memory 220. Additional blocks of code are then loaded as well 224. While it is not necessary to do so, it is preferable to fill the designated space of the local memory with the blocks of code until the designated space is full. A block of code need not necessarily be sized so small that it can only fill a single block of the local memory. It may be sized larger, e.g., to occupy two or more blocks of the local memory. However, such a code block should not be larger than the largest space available in the local memory that is designated for storing code input from external memory.

Once a first block of code has been loaded and its load semaphore has been checked, it is executed 228. It is not necessary to wait until other blocks of code have been loaded; however, it is preferred to load the second block of code to be executed before the first block of code completes its execution in order not to waste time in making a transition to execution of the second block of code. A determination is ultimately made that the first block of code has completed its execution 232. At this point, a flag or semaphore can be set indicating that the memory space in local memory where the first block of code resides is available 236. Such a flag can be located in register R31 of FIG. 1. Such a register has a 32 bit size. These bits are preferably assigned to code or data blocks rather than to specific memory slots. In fact an algorithm with more than 32 blocks would need to reuse these semaphores. The re-use restriction means that blocks that might be loaded at the same time cannot use the same semaphore. Since algorithms typically process sequentially, it is possible to determine which blocks will not occupy memory at the same time.

To safely complete the transition from one algorithm to another algorithm, a convention is required, since different algorithms do not have specific knowledge of each other's semaphore usage. Two possible methods for assigning semaphores to avoid inter-algorithm conflicts are a "slot-based" method and an "order-based" method. In the slot-based method, one assigns three semaphores to each slot. This allows up to 3 blocks to be loaded in each slot and prevents conflicts between algorithms because a new algorithm will not load until the full slot is available. In an "order-based" method, four semaphores are used by the first four blocks of an algorithm and another four are used by the last four of the algorithm. Since these are separate sets, the algorithms will not conflict. Under this method, each algorithm would need at least 8 blocks.

When the first block of code is completed with its execution, the processor begins execution of the second block of code—which by that point should be stored in local memory 240. Furthermore, the processor can check the value of register R31 via a transfer routine and see which flags indicate available space in local memory. When a flag indicates that a block of local memory is available, an additional block of code is loaded into that block of local memory, e.g., where the first block of code resides 244. Once the determination is made to load this new block of code into the available space in local memory, the flag associated with the new block in register R31 is altered to indicate that the space is no longer available 248. When the load completes, the R31 semaphore is altered to indicate that the block is ready to execute. This process is then repeated until the algorithm completes its execution.

It is noted that even when a first algorithm is being processed by the processor that code for a second algorithm can be loaded into local memory. The second algorithm does not need to know any of the specifications of the first algorithm. Rather, the flags, maintained in register R31 for example, are used to indicate when blocks of code from the second algorithm can be loaded into the local memory. This facilitates the implementation of many different algorithms without requiring the different algorithms to know anything about the other algorithms. Furthermore, it provides a framework which allows the implementation of algorithms that will be developed in the future.

Figure 3A:
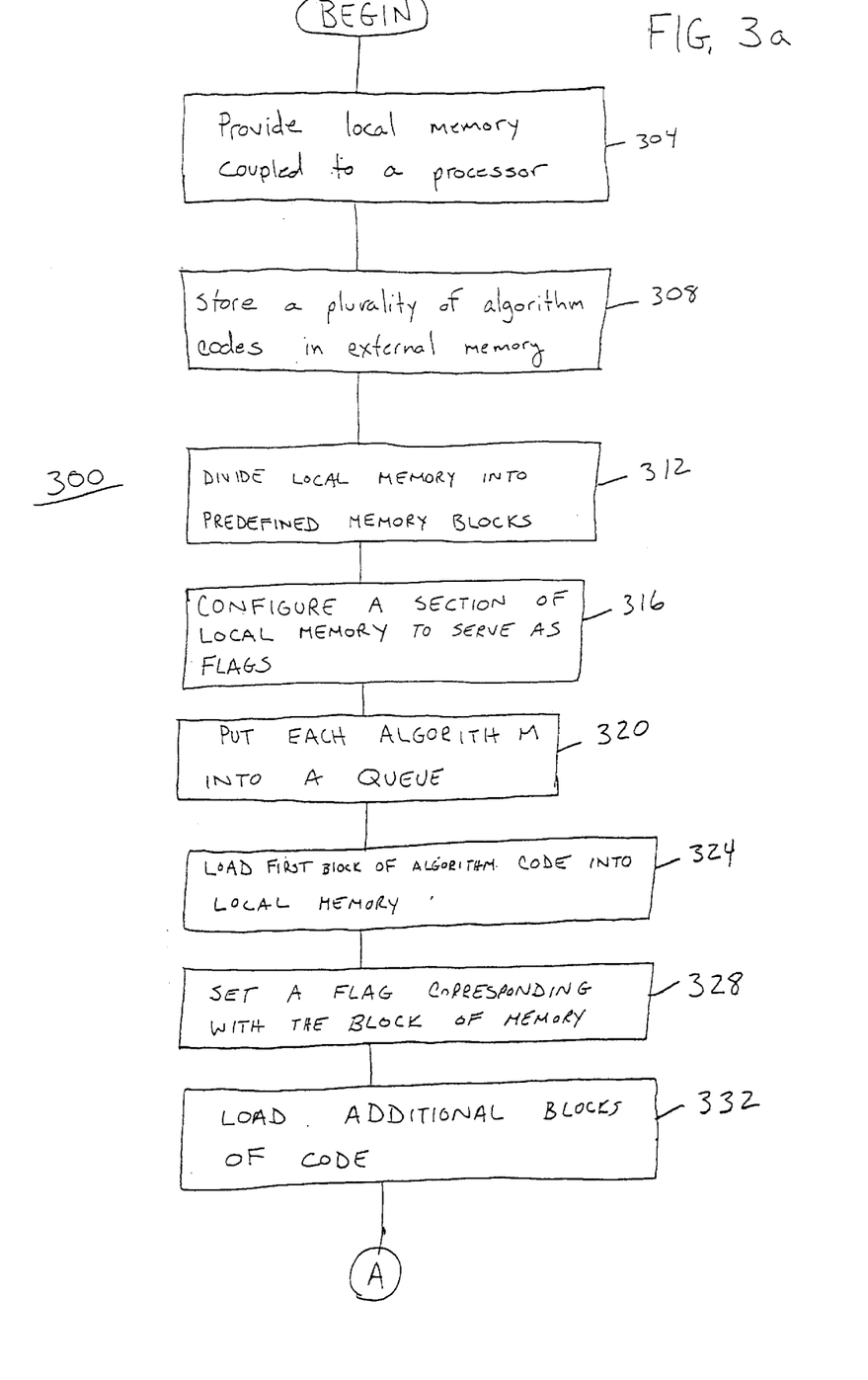
FIGS. 3a and 3b show a flow diagram for implementing an algorithm stored in external memory in which more than one algorithm is implemented by loading them into local memory a block at a time.
Figure 3B:
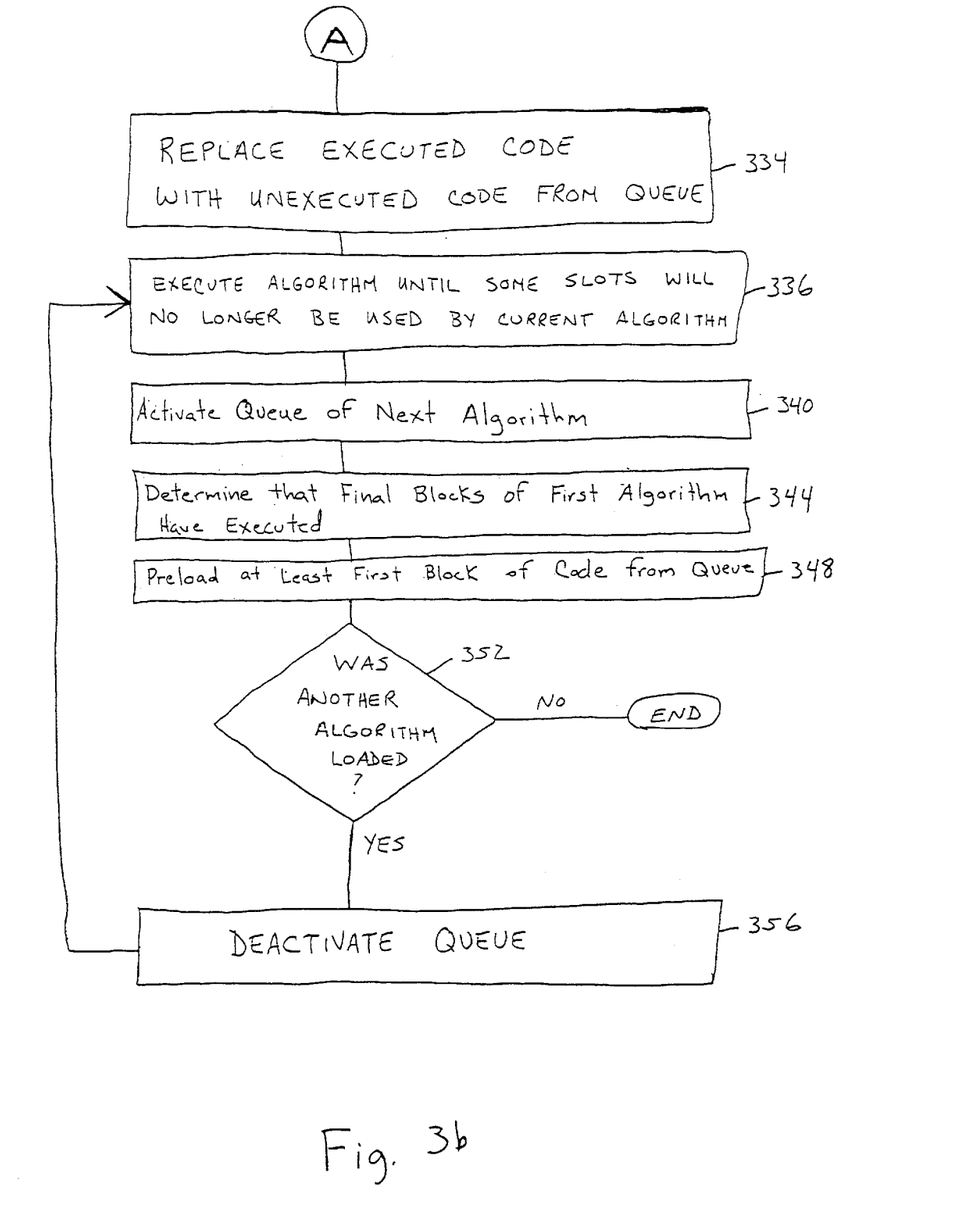

FIGS. 3a and 3b demonstrate one embodiment in which more than one algorithm is implemented by the processor. In the flow chart 300 of FIGS. 3a and 3b, a processor is provided coupled to a local memory 304. Code for several algorithms are stored in external memory 308. For example, these algorithms might be a FFT, DCT, Echo effect, Reverberation effect, or any other algorithm to process the data. In this embodiment, the local memory is again segmented into memory blocks 312. These memory blocks can be of a predefined size. Furthermore, a section of the local memory is configured to store flags for the various blocks of the local memory 316. Alternatively, a register of the processor or other storage unit could be utilized to store the flags. Each of the algorithms is subdivided into portions or blocks that can be loaded into the available space in local memory. These subdivisions are than put into a queue 320 so that they can be loaded into local memory and processed. This is accomplished by loading the first block of algorithm code into local memory 324 and setting the flag corresponding with that block of local memory 328. Then additional blocks of code are loaded 332 and the flags corresponding with their local memory locations are also set. As code is completely executed, the executed code is replaced with unexecuted code from the queue 334. The algorithm is executed until some slots will no longer be used by the current algorithm 336. The queue of the next algorithm is then activated 340. Ultimately, a determination is made that the final blocks of a first algorithm have executed 344. Then, the queue for a succeeding algorithm can be preloaded into the local memory by initially loading at least a first block of code 348. A test is conducted to confirm that code for another algorithm has been loaded 352. If another algorithm has loaded, then the queue is deactivated 356 and the code for the algorithm is executed until some local memory slots will no longer be utilized 336. In this way, the data can continue to be processed with little or no delay.

The following example will help to illustrate the invention further. This example is directed toward an Audio Decoder for decoding audio information. In this example, audio information is received as a datastream formatted for use by a DVD player.

First, it should be understood that an "audio frame" is an atomic unit of a compressed audio format. In other words an audio decoder can always decode a valid frame in its own format, but might produce an error when dealing with a partial frame. In common formats such as AC-3 or MPEG, audio frames have a few characteristics that allow a kind of random access into a compressed stream.

1. A frame begins with an unusual bit pattern so that it is easy to scan a stream for the next frame.

2. All frames in a stream have essentially the same length and produce the same number of samples when decoded. This produces a direct relationship between data size and audio duration.

Because of this, an Audio Decoder at the highest level is just an initialization routine followed by a loop that decodes frames one at a time. Because the invention supports optional plug-ins, the act of decoding a single frame can be a little more complex:

1. The audio decoder converts one compressed frame into M channels of PCM data consisting of N 32-bit samples.

2. An optional plug-in takes the M channels of N samples and reprocesses them into K channels of N 32-bit samples. In other words, a plug-in can modify the original samples and might reorganize them into new channels, too.

3. After the decoded samples are prepared for output, the audio decoder can process the next frame by looping back to step 1.

Audio decoders and plug-ins execute entirely in the processor. While they can save and retrieve data in external memory, they cannot modify it outside of the processor. Inside the processor, Audio Decoders and Plug-ins only have about 4.5K of instruction memory and 5.5K of data memory. This makes it advisable to partition the code and data of an Audio Decoder or Plug-in into smaller stand-alone units called overlays.

To show how algorithm partitioning translates into overlays, this example will be presented based loosely on AC-3. Functionally, this Audio Decoder breaks down to the following stages:

1. Initialize

2. Find beginning of next frame

3. Build exponent tables from input (six channels)

4. Build mantissa tables from input (six channels)

5. For each of the six channels: do a Discrete Cosine Transform (DCT), followed by a Fast Fourier Transform (FFT), followed by another DCT and topped off with a Downmix of the six channels to two 6. Apply any additional algorithms (e.g., Karaoke)

7. Output the final downmixed channels

8. If there is more data to decode, go to step 2.

Each step can vary widely in the amounts of code and data needed—note that step five has to cycle through three subtasks. For this example, assume that each frame generates 256 32-bit samples for each of the six channels. This means that each kind of array (e.g., exponent, mantissa, PCM) requires 1K bytes. With this in mind, Table 1 would be a plausible list of each Stage's memory requirements.

TABLE 1

| Stage | Code Size | Data Size |
|---|---|---|
| Initialization | 1.5K | .5K |
| Find Frame | .3K | .1K |
| Exponents | 3.8K | 8K |
| Mantissas | 2.5K | 8K |
| First DCT | .8K | 2K |
| FFT | 1.5K | 3K |
| Second DCT | 1K | 2K |
| Downmix | 1K | 3K |

Another issue is the destination of Code Overlays. Since they are not relocatable, it is important that the last overlays in a loop clear out in an order that allows efficient reloading of the overlays needed at the start of a loop. In addition, the processor destination of a Code Overlay should be aligned at a 256-byte boundary because this makes it easier to analyze the overlay process.

Table 3 represents the order of Code Overlay execution and those parts of the 4K of instruction RAM that are used in the various stages of the algorithm. Out_ex shows how a second algorithm's overlays co-exist with those of the first. The column labeled "Active" identifies the code overlay that is executing while the memory is assigned as laid out in the rest of the row. Note that only the "Active" Overlay has to be resident. The remaining overlays of a row can be present, partially loaded, or yet to be loaded. They are listed in order to show what memory has been reserved by Code Overlay calls made from previously executed overlays. (Note: in this sample in Table 3, the minimum memory unit is shown as 512 bytes instead of 256.)

The transition from the first to the second line of the table is a model for all of the other transitions, so it is useful to cover it in some detail. Initialization overlays, such as init_ex, are always loaded into the upper memory area because that leaves space for the code to preload some of the first overlays. Because init_ex leaves 2.5K, it makes calls to load exp1_ex and exp2_ex. When init_ex is ready to exit, it performs a routine that releases init_ex, loads exp3_ex into the space it previously occupied, waits for the event that declares exp1_ex has loaded and goes to exp1_ex's entry point. When exp1_ex begins, exp1_ex is fully transferred, exp2_ex may or may not be fully transferred and exp3_ex probably hasn't begun transferring.

After out_ex is done in line 33, it can load exp3_ex and start executing the next frame with the code in line 2. So, this example meets the minimum requirement of loop repetition. However, it could still be made more efficient. For example, line 4 has 1.5K of memory with no pending Overlay load. If exp3_ex and exp4_ex execute quickly, there might be a wait for mnt1_ex before going to line 6. This can actually be fixed quite easily by shifting the start point of exp3_ex from 800 to a00. Then mnt1_ex could be loaded one step earlier.

In order to illustrate how different algorithms interact, refer to line 29 of Table 3. After the fft1_ex block finishes,

TABLE 2

| Name | Size | From Stage |
|---|---|---|
| init_ex | 1.5K | Initialization |
| exp1_ex | .9K | Find Frame and first part of Exponents |
| exp2_ex | 1K | Exponents, second part |
| exp3_ex | 1.3K | Exponents, third part |
| exp4_ex | .9K | Exponents, fourth part |
| mnt1_ex | 1.5K | Mantissas, first part |
| mnt2_ex | 1K | Mantissas, second part |
| dct1_ex | .8K | First DCT |
| fft1_ex | .5K | FFT, first part |
| fft2_ex | 1.5K | FFT, second part |
| dct2_ex | 1.5K | Second DCT |
| dmix_ex | 1K | Downmix |

TABLE 3

| Line # | Active | 000–1ff | 200–3ff | 400–5ff | 600–7ff | 800–9ff | a00bff | c00–dff | e00–fff |
|---|---|---|---|---|---|---|---|---|---|
| 1 | init_ex | | | | | | init_ex | init_ex | init_ex |
| 2 | exp1_ex | exp1_ex | exp1_ex | exp2_ex | exp2_ex | exp3_ex | exp3_ex | exp3_ex | |
| 3 | exp2_ex | exp4_ex | exp4_ex | exp2_ex | exp2_ex | exp3_ex | exp3_ex | exp3_ex | |
| 4 | exp3_ex | exp4_ex | exp4_ex | | | exp3_ex | exp3_ex | exp3_ex | |
| 5 | exp4_ex | exp4_ex | exp4_ex | mnt1_ex | mnt1_ex | mnt1_ex | mnt2_ex | mnt2_ex | mnt2_ex |
| 6 | mnt1_ex | dct1_ex | dct1_ex | mnt1_ex | mnt1_ex | mnt1_ex | mnt2_ex | mnt2_ex | mnt2_ex |
| 7 | mnt2_ex | dct1_ex | dct1_ex | fft1_ex | | | mnt2_ex | mnt2_ex | mnt2_ex |
| 8 | dct1_ex | dct1_ex | dct1_ex | fft1_ex | dmix_ex | dmix_ex | fft2_ex | fft2_ex | fft2_ex |
| 9 | fft1_ex | dct2_ex | dct2_ex | fft1_ex | dmix_ex | dmix_ex | fft2_ex | fft2_ex | fft2_ex |
| 10 | fft2_ex | dct2_ex | dct2_ex | fft1_ex | dmix_ex | dmix_ex | fft2_ex | fft2_ex | fft2_ex |
| 11 | dct2_ex | dct2_ex | dct2_ex | fft1_ex | dmix_ex | dmix_ex | fft2_ex | fft2_ex | fft2_ex |
| 12 | dmix_ex | dct1_ex | dct1_ex | fft1_ex | dmix_ex | dmix_ex | fft2_ex | fft2_ex | fft2_ex |
| | Repeat lines 8–12 four times to do channels 2, 3, 4, 5 | | | | | | | | |
| 28 | dct1_ex | dct1_ex | dct1_ex | fft1_ex | dmix_ex | dmix_ex | fft2_ex | fft2_ex | fft2_ex |
| 29 | fft1_ex | dct2_ex | dct2_ex | fft1_ex | dmix_ex | dmix_ex | fft2_ex | fft2_ex | fft2_ex |
| 30 | fft2_ex | dct2_ex | dct2_ex | | dmix_ex | dmix_ex | fft2_ex | fft2_ex | fft2_ex |
| 31 | dct2_ex | dct2_ex | dct2_ex | | dmix_ex | dmix_ex | out_ex | out_ex | out_ex |
| 32 | dmix_ex | exp1_ex | exp1_ex | | dmix_ex | dmix_ex | out_ex | out_ex | out_ex |
| 33 | out_ex | exp1_ex | exp1_ex | exp2_ex | exp2_ex | | out_ex | out_ex | out_ex |

TABLE 4

| Stage | Code Size | Data Size |
|---|---|---|
| Output/End of Data Check | 1K | 4K |

The Audio Decoder starts out with 4.5K of instruction RAM and 5.5K of data a RAM. Typically, it will allocate 0.5K of code space to the Main Loop and 1.5K of the data a space to internal variables. This effectively leaves 4K of instruction RAM and 4K of data a RAM for overlays.

The Data Overlays are more straightforward than the Code Overlays because the data is already split into 1K arrays (with an occasional 2K intermediate calculation array). The code can be written to swap these units in and out of local memory. The only problem arises when a calculation needs more than 4K of data present (e.g., if the contents of four 1K arrays are used to build a new 1K array). In this case, the loop would have to be written to do the calculation from a smaller buffer, perhaps doing two sets of 128 values instead of all 256 at once.

As noted earlier, code overlays are most efficient when they execute long enough to allow the next code overlay to load. Therefore, it is best to keep overlays to an average of 1K bytes and to try to avoid going over 2K bytes. Therefore, assume these guidelines were used to break up the various stages of the Audio Decoder example into overlays as shown in Table 2.

its execution area is no longer required by the audio decoder algorithm. So, some code would be added to fft1_ex to enable the output algorithm's queue and to set the flags to indicate its former memory space is available. In steps 29–32, a routine is used to exit fft1_ex, fft2_ex, dct2_ex and dmix_ex. This routine would check whether out_ex can be loaded. In this example, out_ex would start loading when fft2_ex finishes in step 30. If background hardware and software handle the load, speed is gained because out_ex loads while dct2_ex executes in parallel.

In Table 4, an output algorithm is shown. Because the output algorithm has only one element, its queue can be used to preload the starting overlays of the audio decoder algorithm as seen in lines 32 and 33 of Table 3.

The above example serves to illustrate how the invention could be used as a specific audio decoder interacting with a general output algorithm. However, it could also be utilized in processing data in other applications, as well. For example, it would similarly be applicable for the processing of video information, such as the information received by a DVD player or set-top box.

Figure 4A:
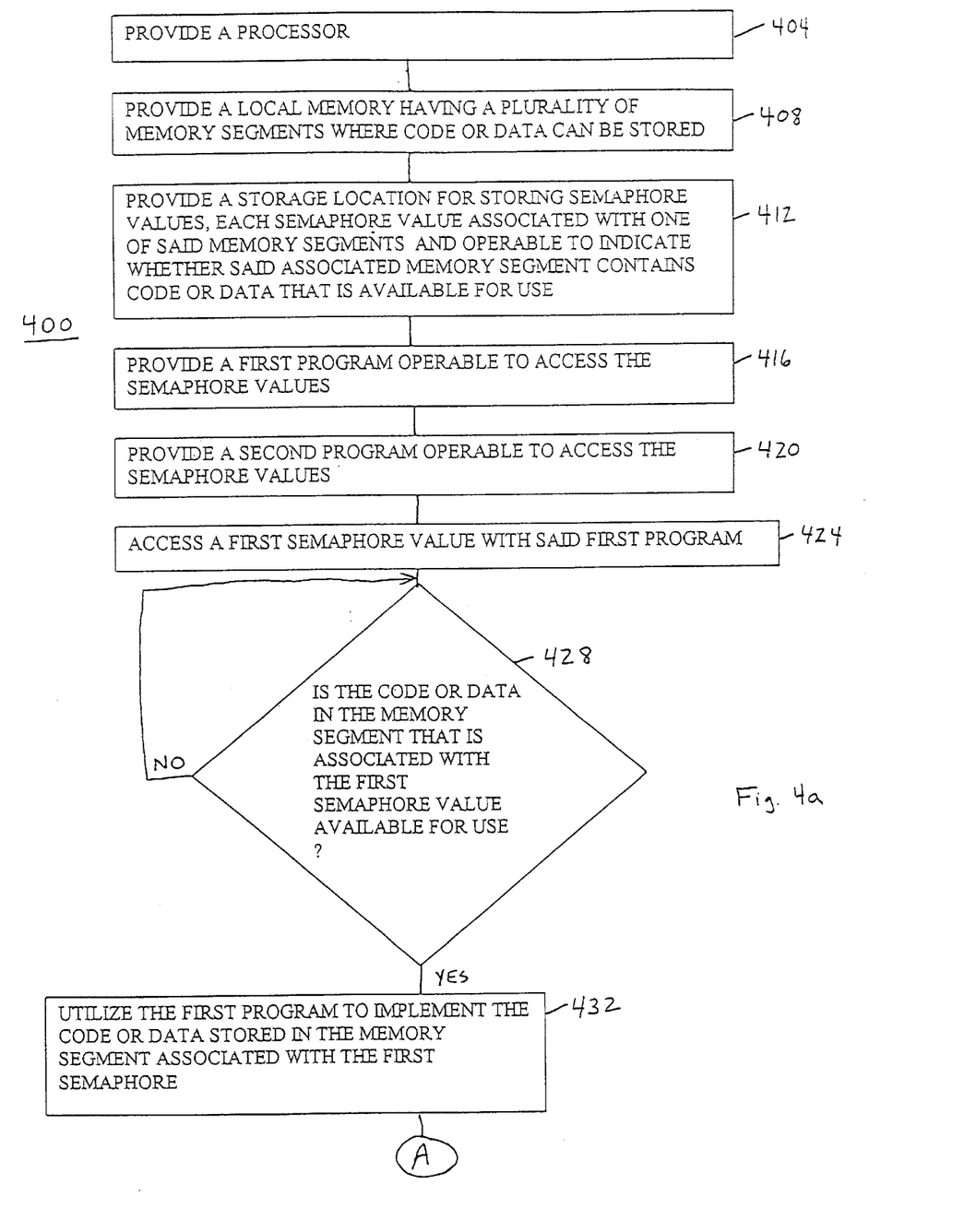
FIGS. 4a, 4b, and 4c show a flow diagram for implementing an embodiment of the invention.
Figure 4B:
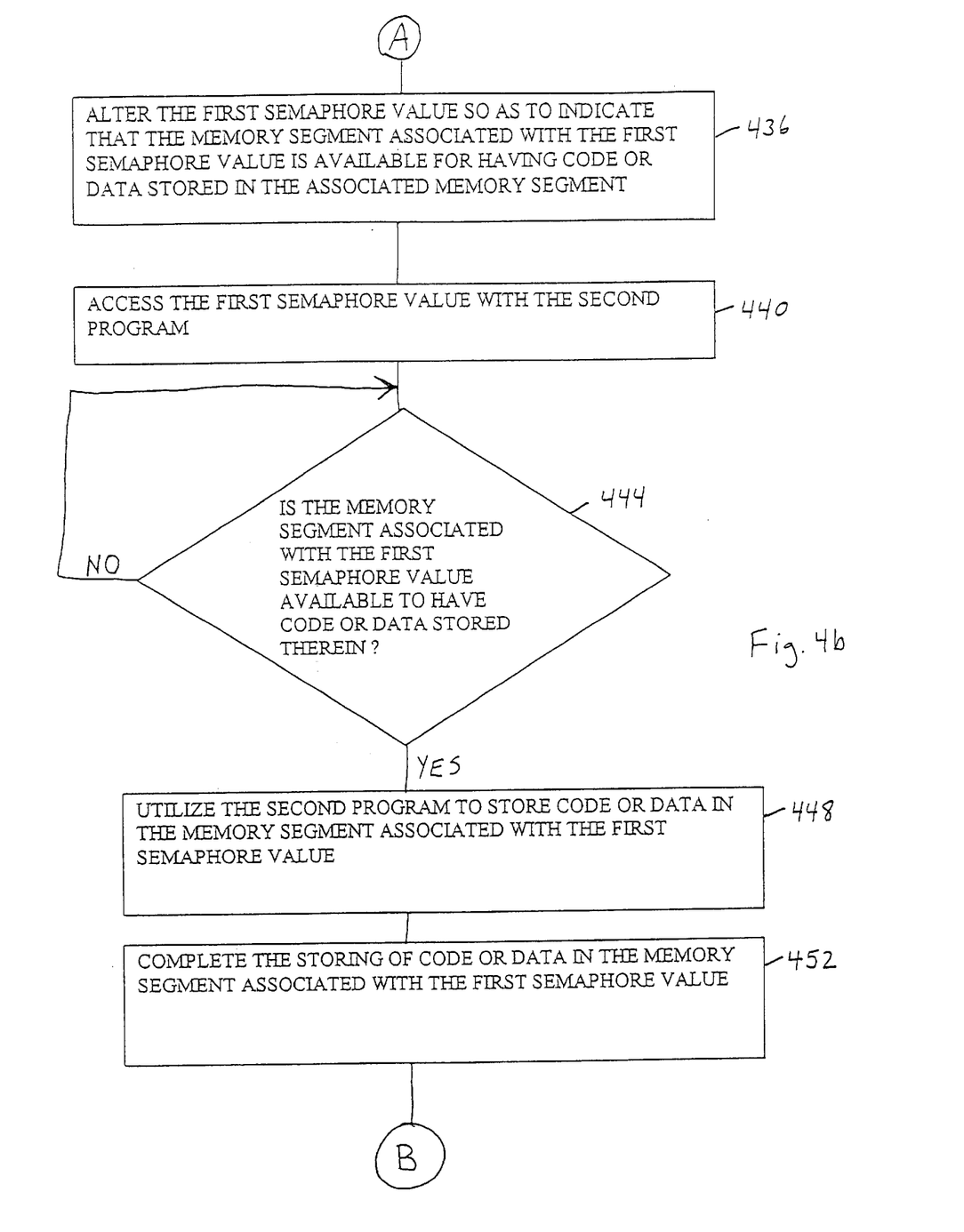
Figure 4C:
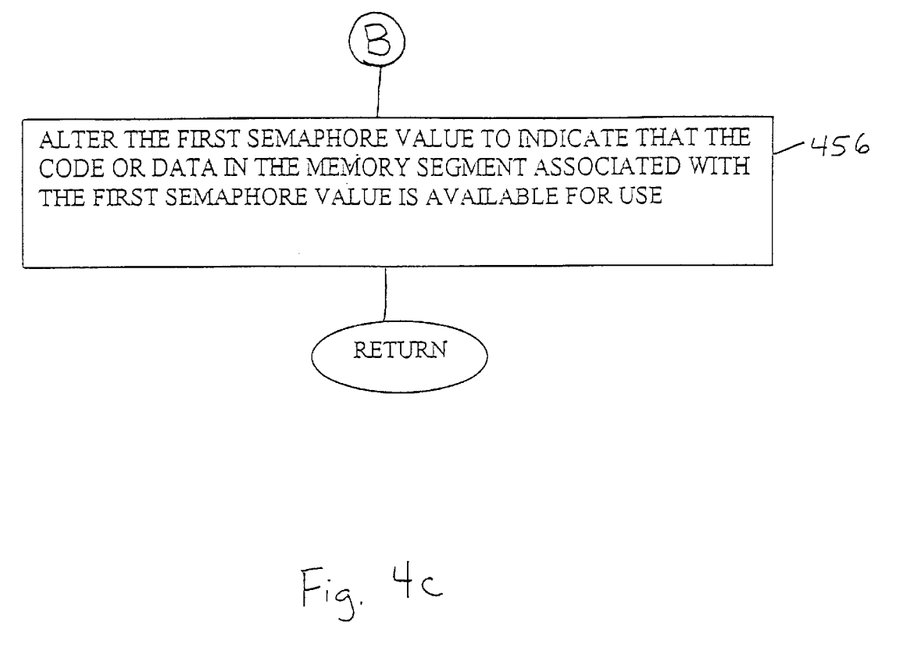

Another embodiment of the invention can be seen with reference to FIGS. 4a, 4b, and 4c. As has been described above, a semaphore system can be utilized to indicate when code or data stored in a local memory of a processor can be implemented or written over. Thus, such a semaphore system is capable of allowing two different programs determine when the memory is available. Thus, a first program that actually utilizes the code or data stored in local memory can access the semaphore system to see when it is acceptable to use the code or data stored in local memory. Similarly, a background program which loads code or data into local memory from external memory can rely on the semaphore system to determine when the local memory is available for such storing of code or data. Thus, such a semaphore system is utilizable by two different programs.

FIGS. 4a, 4b, and 4c illustrate a flow chart 400 for accomplishing an embodiment of the invention. In FIG. 4a, a processor is provided 404. The processor can be any type of processor, such as a microprocessor. In block 408, a local memory having a plurality of memory segments where code or data can be stored is provided. Thus, this would be the local internal memory of the processor that could be logically segmented by a programmer prior to coding a program, as explained above.

In block 412, a storage location is provided for storing semaphore values. Each semaphore value is associated with one of the memory segments and operable to indicate whether the associated memory segment contains code or data that is available for use. Thus, a register of a processor or a scalar accessible by the processor could be utilized for holding the semaphore values. For example, each bit of a register could indicate the status of a memory segment. Thus, for a 32 bit register, 32 segments of local memory could be represented. Alternatively, other storage locations could be utilized as well, as alternatives to the use of a single register. Similarly, an entire register need not be utilized. In the example illustrated earlier, only 8 bits of a register would be needed to coincide with the 4 storage locations for data and 4 storage locations for code in the local memory of the processor.

In block 416 of FIG. 4a, a first program operable to access the semaphore values is provided. The first program could be a routine that is located in reserved memory of the processor. Thus, by being stored in a reserved section of local memory of the processor, it would not be written over with new code or data. The first program would be operable to access the code or data stored in local memory of the processor and implement that accessed code or data. Thus, if code operable to implement a portion of the FFT program were stored in local memory of the processor, the first program would be operable to access the local memory and begin implementing that FFT code. Similarly, the first program would be operable to access any data stored in the local memory.

In block 420 of FIG. 4a, a second program operable to access the semaphore values is provided. The second program could be a program responsible for loading new blocks of code or data that will be used by the first program. Thus, the second program could load code or data from external memory into internal memory. To know when it was acceptable to load code or data into local memory, the second program would need to know the status of the various memory segments. Thus, by accessing the semaphore value for a segment, the second program could determine availability. It is also envisioned that the second program could perform other functions.

In block 424, the first program accesses one of the semaphore values, e.g., a first semaphore value. By associating a predetermined meaning with a semaphore value, the processor can determine the status of a memory segment in local memory by comparing the actual value of the semaphore with a lookup list of predetermined semaphore values. Thus, in 428, a determination can be made as to whether the code or data in the memory segment that is associated with the first semaphore value is available for use. For example, if the first 8 bits of a register of a microprocessor are used, a value of "1" could be utilized to indicate that any code or data stored in that memory segment is available for use by the first program. Similarly a "0" could indicate that the second program is allowed to store code or data in that memory segment.

If in block 428 a memory segment is not available for use by the first program, the "NO" branch of the flowchart shows that the test can be made again at a later time. In other words, a typical implementation would execute the next segment of application code and would test the semaphore again after that segment has been completed. However, if the code or data in the memory segment is available, then the "YES" branch indicates that block 432 can be implemented.

In block 432 of FIG. 4a, the first program is utilized to implement the code or data stored in the memory segment associated with the first semaphore. Thus, for example, if the code or data is for use as part of an FFT or DCT routine, the processor can access it and implement that portion of the routine.

In FIG. 4b, the flow chart continues with block 436. In block 436, the first semaphore value is altered so as to indicate that the memory segment of the local memory associated with the first semaphore value is available for having code or data stored in that associated memory segment. Thus, for example, the processor can access the register where semaphore values are held and alter the semaphore value corresponding to the segment of memory accessed in block 432. That is to say, after the code or data is utilized by the first program, the semaphore value can be changed to reflect that the memory segment is now available for a new block of code or data.

In block 440, the first semaphore value is accessed by the second program. As explained earlier, the second program might be a program to transfer code or data from external memory to local memory. For example, it could be a program stored in a reserved section of local memory for use by the processor to instruct a direct memory access (DMA) routine to copy code or data from external memory to local memory. Once copied into local memory, the processor could implement the code or data through use of the first program. Again, in block 440, the accessing of a first semaphore value with the second program could be accomplished, for example, by accessing the register which stores the semaphore values and having a table lookup that associates addresses in local memory with a particular bit of the register.

In block 444, a determination is made as to whether the memory segment associated with the first semaphore value is available to have code or data stored therein. For example, if the value of "0" for a bit in a register is preassigned to be indicative that code or data can be copied into the corresponding local memory section, then the processor can determine that a value of "0" for a semaphore means that the memory segment is available. If the memory segment is not available, the "NO" branch indicates that the memory segment can be checked at a later point in time. Otherwise, if the memory segment is determined to be available, block 448 can be implemented.

In block 448, the second program is utilized to store code or data in a memory segment associated with a first semaphore value. Thus, if the semaphore associated with a memory segment indicates that the memory segment is available to receive new code or data, then the second program can copy code or data into that internal memory location, e.g., from external memory. Block 452 shows completing the storing of code or data in the memory segment associated with the first semaphore value.

FIG. 4c illustrates in block 456 that the first semaphore value can be altered to indicate that the code or data in the memory segment associated with the first semaphore value is available for use. Thus, the second program or a routine called by the second program, e.g., a DMA transfer routine, can alter the value of the bit in a register associated with a memory segment to indicate that the code or data in that segment is now ready for use by the processor. Thus, such an alteration could be used to indicate to the first program that the code or data in a memory segment is available for use.

While this embodiment of the invention has been described with reference to a first semaphore, it could be applied to a plurality of semaphores in a concurrent manner. Thus, several semaphores could be altered by the first program and then later altered by the second program, or vice versa. Furthermore, in loading and using memory segments, the process could be implemented repeatedly to allow the processor to load data and code into local memory and then utilize that data or code, followed by another cycle.

In addition to embodiments where the invention is accomplished by hardware, it is also noted that these embodiments can be accomplished through the use of an article of manufacture comprised of a computer usable medium having a computer readable program code embodied therein, which causes the enablement of the functions and/or fabrication of the hardware disclosed in this specification. For example, this might be accomplished through the use of hardware description language (HDL), register transfer language (RTL), VERILOG, VHDL, or similar programming tools, as one of ordinary skill in the art would understand. Therefore, it is desired that the embodiments expressed above also be considered protected by this patent in their program code means as well.

It is also noted that many of the structures and acts recited herein can be recited as means for performing a function or steps for performing a function, respectively. Therefore, it should be understood that such language is entitled to cover all such structures or acts disclosed within this specification and their equivalents.

For related subject matter concerning this invention, reference is made to U.S. patent applications Ser. Nos. 09/671,932, entitled "Method and Apparatus for Multi-Part Processing of Program Code by a Single Processor", 09/672,517 entitled "Multi-Component Processor" and, 09/678,898 entitled "Method and Apparatus for Processing Data with Semaphores," which are hereby incorporated by reference.

What is claimed is:

1. A method of processing, comprising:

providing a processor having a local memory for storing code;

configuring said local memory into a plurality of blocks of memory;

providing an external memory for use by said processor;

storing a program of code in sad external memory, wherein said program of code is segmented into blocks of code which can be stored in said blocks of memory of said local memory;

storing a first block of code in a memory space in at least one block of memory of said local memory;

storing a second block of code in said local memory; and when said first block of code is completely stored into said local memory, initiating execution of said first block of code.

2. The method of processing as described in claim 1 and further comprising:

determining that at least one block of code in said local memory has completed execution; and replacing said executed block of code with a further block of code.

3. The method of processing as described in claim 2 and further comprising:

determining that at least one memory space of said local memory is available; and storing a first block of code from a second program in said available memory space of said local memory while said first program code is still executing.

4. The method of processing as described in claim 1 and further comprising:

utilizing a semaphore to indicate when said memory space of said local memory is available.

5. A apparatus comprising:

a processor;

a first local memory of said processor;

an external memory for use by said processor;

a program of code for processing by said processor;

a second local memory of said processor configured to store data for use by said code stored in said first local memory;

a semaphore having at least one bit for indicating when at least one block of said first local memory is available;

a second processor operable for receiving a stream of data formatted for use by a DVD player; and a third processor operable for processing video components of said stream of data, wherein said program of code is operable to process audio components of said stream of data, wherein said program of code is segmented into blocks of code which can be stored in corresponding memory blocks in said local memory, and wherein memory requirements for storing said program of code are larger than a total portion of said local memory designated for storing said blocks of code.

6. The apparatus as described in claim 5 and further comprising a second program of code for processing by said processor.

7. The apparatus as described in claim 5 wherein said blocks of code of said program of code are stored as a queue for loading into said fit local memory.

8. The apparatus as described in claim 7 wherein said queue further comprises at least one block of data for loading into said second local memory.

9. A method of preparing program code for use by a processor having limited local memory, comprising:

preparing a program of code for use by a processor having a local memory;

determining a fundamental memory block size of said local memory; segmenting said program of code into a plurality of blocks of code for loading into said local memory;

storing said blocks of code in an external memory separate from said processor preparing a second program of code for use by said processor;

segmenting said second program of code into a second plurality of code for loading into said local memory; and arranging said blocks of code of said program of code and said second program of code into a queue.

10. The method of preparing a program code as described in claim 9 and further comprising:

arranging said blocks of code of said program of code into a queue for loading into said local memory of said processor.

11. Computer program product for processing, comprising:

computer code for providing a processor having a local memory for storing code;

computer code for configuring said local memory into a plurality of blocks of memory;

computer code for providing an external memory for use by said processor;

computer code for storing a program of code in said external memory, wherein said program of code is segmented into blocks of code which can be stored in said blocks of memory of said local memory;

computer code for storing a first block of code in memory space in at least one block of memory of said local memory;

computer code for storing a second block of code in said local memory; computer code for determining when said first block of code is completely stored into said local memory;

computer code for initiating execution of said first block of code; and computer readable medium for storing the computer code.

12. Computer program product as described in claim 11 and further comprising:

computer code for determining that at least one block of code in said local memory has completed execution; and computer code for replacing said executed block of code with a further block of code.

13. Computer program product as described in claim 12 and further comprising:

computer code for determining that at least one memory space of said local memory is available; and storing a first block of code from a second program in said available memory space of said local memory while said first program code is still executing.

14. Computer program product as described in claim 11 and further comprising:

computer code for utilizing a semaphore to indicate when said memory locations of said local memory are available.

15. Computer program product for preparing program code for use by a processor having limited local memory, comprising:

computer code for preparing a program of code for use by a processor having a local memory;

computer code for determining a fundamental memory block size of said local memory; segmenting said program of code into a plurality of blocks of code for loading into said local memory;

computer code for storing said blocks of code in an external memory separate from said processor computer code for preparing a second program of code for use by said processor;

computer code for segmenting said second program of code into a second plurality of code for loading into said local memory;

computer code for said blocs of code of said program of code and said second program of code into a queue; and computer readable medium for storing the computer code.

16. Computer program product as described in claim 15 further comprising:

computer code for arranging said blocks of code of said program of code and said second program of code into a queue.

* * * * *

UNITED STATES PATENT AND TRADEMARK OFFICE
CERTIFICATE OF CORRECTION

PATENT NO. : 6,775,757 B1
DATED : August 10, 2004
INVENTOR(S) : Richard K. Greicar It is certified that error appears in the above-identified patent and that said Letters Patent is hereby corrected as shown below:

Column 12,
Line 22, change "sad external" to -- said external --.
Line 51, change "A apparatus" to -- An apparatus --.

Column 13,
Line 12, change "said fit" to -- said first --.
Line 22, change "pluality of" to -- plurality of --.
Line 52, change "in memory" to -- in a memory --.

Column 14,
Line 45, change "for said" to -- for arranging said --.

Signed and Sealed this

Nineteenth Day of October, 2004

JON W. DUDAS
*Director of the United States Patent and Trademark Office*